United States Patent
Hong et al.

(10) Patent No.: US 10,824,280 B2
(45) Date of Patent: Nov. 3, 2020

(54) TOUCH SENSOR AND DISPLAY DEVICE HAVING THE SAME

(71) Applicant: Samsung Display Co., Ltd., Yongin-si (KR)

(72) Inventors: Jong Ho Hong, Yongin-si (KR); Mu Gyeom Kim, Yongin-si (KR); Won Sang Park, Yongin-si (KR); Young Seok Seo, Yongin-si (KR); Won Ki Hong, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 204 days.

(21) Appl. No.: 15/643,433

(22) Filed: Jul. 6, 2017

(65) Prior Publication Data

US 2018/0018044 A1    Jan. 18, 2018

(30) Foreign Application Priority Data

Jul. 14, 2016   (KR) .................... 10-2016-0089435

(51) Int. Cl.
*G06F 3/044*    (2006.01)
*G06F 3/041*    (2006.01)

(52) U.S. Cl.
CPC .......... *G06F 3/044* (2013.01); *G06F 3/0414* (2013.01); *G06F 2203/04105* (2013.01); *G06F 2203/04106* (2013.01); *G06F 2203/04111* (2013.01)

(58) Field of Classification Search
CPC ............................ G06F 3/044; G06F 3/0414
See application file for complete search history.

(56) References Cited

U.S. PATENT DOCUMENTS

| | | | |
|---|---|---|---|
| 8,723,813 B2 | 5/2014 | Park et al. | |
| 9,262,031 B1* | 2/2016 | Moon | G06F 3/044 |
| 2006/0170659 A1* | 8/2006 | Yamamoto | G06F 3/0414 |
| | | | 345/173 |
| 2013/0277100 A1* | 10/2013 | Ra | H05K 3/06 |
| | | | 174/268 |
| 2013/0338847 A1* | 12/2013 | Lisseman | H03K 17/9625 |
| | | | 700/301 |
| 2015/0002447 A1* | 1/2015 | Schediwy | G06F 1/1692 |
| | | | 345/174 |
| 2015/0226995 A1* | 8/2015 | Aota | H01L 23/49816 |
| | | | 349/149 |

(Continued)

FOREIGN PATENT DOCUMENTS

| | | |
|---|---|---|
| KR | 10-2016-0016734 | 2/2016 |
| KR | 10-2017-0140460 | 12/2017 |

*Primary Examiner* — Kent W Chang
*Assistant Examiner* — Chayce R Bibbee
(74) *Attorney, Agent, or Firm* — H.C. Park & Associates, PLC

(57) ABSTRACT

A touch sensor may include a base substrate, a sensing unit including a first electrode and a second electrode provided on a same layer of the base substrate and not overlapping with each other, wherein a capacitance of the sensing unit is changed by a user's touch, and a cushion layer disposed on at least one surface of the sensing unit and configured to have a permittivity change in response to a pressure of the user's touch, wherein the cushion layer may include an insulator and conductive particles and the insulator may include an elastic material elastically deformed by the pressure of the user's touch.

35 Claims, 10 Drawing Sheets

(56) References Cited

U.S. PATENT DOCUMENTS

2016/0035290 A1* 2/2016 Kim .................... G06F 3/0412
 345/174
2016/0066411 A1 3/2016 Hong et al.
2016/0188082 A1 6/2016 Ham et al.
2017/0357344 A1 12/2017 Hong et al.

\* cited by examiner

TOUCH SENSOR AND DISPLAY DEVICE HAVING THE SAME

CROSS-REFERENCE TO RELATED APPLICATION

This application claims priority from and the benefit of Korean Patent Application No. 10-2016-0089435, filed on Jul. 14, 2016, which is hereby incorporated by reference for all purposes as if fully set forth herein.

BACKGROUND

Field

Exemplary embodiments relate generally to a touch sensor and a display device having the same.

Discussion of the Background

Interest in information displays has been on the rise, and demand for portable information media has increased. Accordingly, there has been an increasing demand for display devices, and increased emphasis on the commercialization thereof.

The latest display devices include a touch sensor display which is designed to both display an image and receive a user's touch input. Thus, a user may use the display device more conveniently with the use of the touch sensor.

Recently, additional functions have been made available by making use of a pressure generated by a touch in addition to a touch position.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide a touch sensor detecting pressure of a touch.

Exemplary embodiments provide a touch sensor detecting a touch position and a touch pressure.

Exemplary embodiments provide a display device having a touch sensor.

Exemplary embodiments provide a display device having improved reliability when folded.

Additional aspects will be set forth in the detailed description which follows, and, in part, will be apparent from the disclosure, or may be learned by practice of the inventive concept.

An exemplary embodiment discloses a touch sensor that includes a base substrate, a sensing unit including a first electrode and a second electrode provided on a same layer of the base substrate and not overlapping with each other, wherein a capacitance of the sensing unit is changed by a user's touch, and a cushion layer disposed on at least one surface of the sensing unit and configured to have permittivity change in response to a pressure of the user's touch, wherein the cushion layer may include an insulator and conductive particles, and the insulator may include an elastic material elastically deformed by the pressure of the user's touch.

Another exemplary embodiment discloses a touch sensor that includes a base substrate, a sensing unit including a first electrode and a second electrode provided on a same layer of the base substrate and not overlapping with each other, wherein a capacitance of the sensing unit is changed by a user's touch, and a cushion layer disposed on at least one surface of the sensing unit, wherein a permittivity of the cushion layer is configured to change depending on a pressure of the user's touch, wherein the cushion layer may include a base layer having a first permittivity and a cavity distributed in the base layer and having a second permittivity different from the first permittivity.

Yet another exemplary embodiment discloses a display device that includes a display panel having a front surface on which an image is displayed, and a touch sensor provided on at least one surface of the display panel and detecting a touch position and a touch pressure, wherein the touch sensor includes: a sensing unit including a first electrode and a second electrode provided on a same layer and not overlapping with each other, wherein a capacitance of the sensing unit is changed by a touch made by a user, and a cushion layer disposed on at least one surface of the sensing unit, wherein a permittivity of the cushion layer is configured to change in response to a pressure of the user's touch, wherein the cushion layer may include an insulator and conductive particles and the insulator may include an elastic material elastically deformed by the touch pressure.

An exemplary embodiment also discloses a display device that includes a display panel having a front surface on which an image is displayed, and a touch sensor provided under the display panel and detecting a touch position and a touch pressure, wherein the touch sensor includes: a sensing unit including a first electrode and a second electrode provided on a same layer and not overlapping with each other, wherein a capacitance of the sensing unit is changed by a user's touch, and a cushion layer disposed on at least one surface of the sensing unit, wherein a permittivity of the cushion layer is configured to change in response to a pressure of the user's touch, wherein the cushion layer may include a first surface on which the sensing unit is provided and a second surface opposite to the first surface, and the first surface of the cushion layer and a lower portion of the display panel face each other.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

FIG. 3A illustrates the touch sensor when pressure is not applied by a user, FIG. 3B illustrates the touch sensor when a small pressure is applied by the user, and FIG. 3C illustrates the touch sensor when a large pressure is applied by the user.

DETAILED DESCRIPTION OF THE ILLUSTRATED EMBODIMENTS

Figure 1:
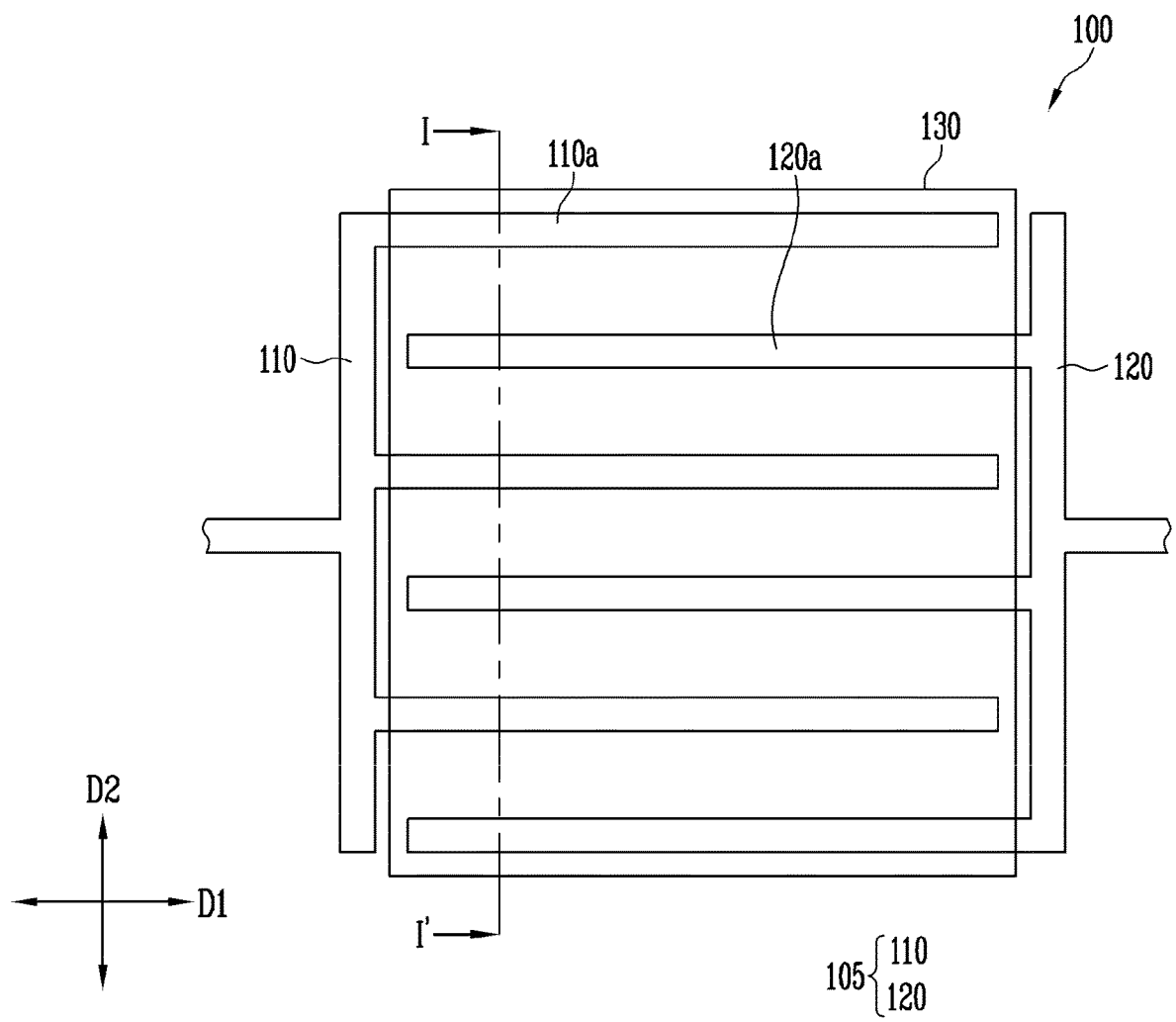
FIG. 1 is a plan view illustrating a touch sensor according to one or more exemplary embodiments.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms "first," "second," etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Hereinafter, a touch sensor and a display device will be described in detail with reference to various exemplary embodiments and the accompanying drawings.

Figure 2:
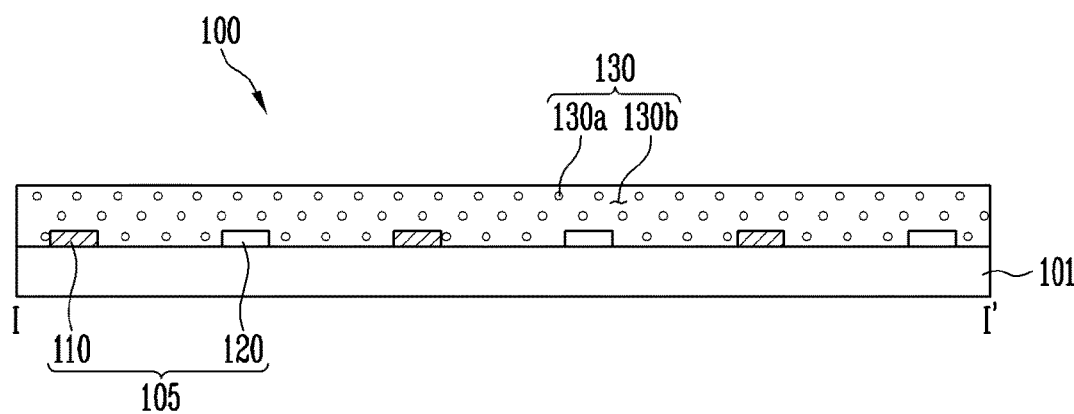
FIG. 2 is a cross-sectional view taken along sectional line I-I' of FIG. 1.

FIG. 1 is a plan view illustrating a touch sensor according to one or more exemplary embodiments. FIG. 2 is a cross-sectional view taken along sectional line I-I' of FIG. 1.

Referring to FIGS. 1 and 2, a touch sensor 100 may include a base substrate 101, and a sensing unit 105 and a cushion layer 130 provided on the base substrate 101.

According to one or more exemplary embodiments, at least a portion of the touch sensor 100 may be flexible. The touch sensor 100 may be formed into various shapes. For example, at least a portion of the touch sensor 100 may be bent, folded, or rolled. At least some of the components of the touch sensor 100 may be flexible.

The base substrate 101 may include an insulating material such as glass, organic polymer, and quartz. In addition, the base substrate 101 may include a material with flexibility so that the base substrate 101 may be bendable or foldable, and have a single-layer structure or a multilayer structure.

For example, the base substrate 101 may included at least one of polystyrene, polyvinyl alcohol, polymethyl methacrylate, polyethersulfone, polyacrylate, polyetherimide, polyethylene naphthalate, polyethylene terephthalate, polyphenylene sulfide, polyarylate, polyimide, polycarbonate, triacetate cellulose, and cellulose acetate propionate. However, the base substrate 101 is not limited thereto, and may include various materials without departing from the inventive concept.

The sensing unit 105 may include a first electrode 110 and a second electrode 120 which are provided over the base substrate 101 and separated from each other.

The first electrode 110 may include a conductive material. The conductive material may include metals or an alloy thereof. These metals may include gold (Au), silver (Ag), aluminum (Al), molybdenum (Mo), chromium (Cr), titanium (Ti), nickel (Ni), neodymium (Nd), copper (Cu), and platinum (Pt). The first electrode 110 may include a conductive transparent material. Examples of the transparent conductive material may include silver nanowire (AgNW), Indium Tin Oxide (ITO), Indium Zinc Oxide (IZO), Antimony Zinc Oxide (AZO), Indium Tin Zinc Oxide (ITZO), Zinc Oxide (ZnO), and Tin Oxide (SnO2), a carbon nanotube, and graphene.

The second electrode 120 may be separated from the first electrode 110 and include a conductive material. The conductive material of the second electrode 120 may be selected from the materials forming the first electrode 110. The second electrode 120 may include the same or different material from the first electrode 110.

According to one or more exemplary embodiments, the first electrode 110 may include a plurality of first branch portions 110a that are spaced apart from each other. The first branch portions 110a may extend in one direction, e.g., a first direction D1, and be arranged in a direction crossing the first direction D1 (for example, a second direction D2).

The second electrode 120 may include a plurality of second branch portions 120a that are separated from each other. The second branch portions 120a may extend in one direction, for example, the first direction D1 and be arranged in the second direction D2.

The first branch portions 110a of the first electrode 110 and the second branch portions 120a of the second electrode 120 may be alternately arranged over the base substrate 101. Since the first branch portions 110a and the second branch portions 120a are alternately arranged, the distance between the first branch portions 110a and the second branch portions 120a may be reduced and an area where the first and second branch portions 110a and 120a correspond to each other may be increased. As a result, capacitance between the first electrode 110 and the second electrode 120 may be increased.

The first electrode 110 and the second electrode 120 may be formed by a single process. For example, the first electrode 110 and the second electrode 120 may be patterned by photolithography using a single mask, or by coating. As a result, the first electrode 110 and the second electrode 120 may share the same lower layer. In other words, the first electrode 110 and the second electrode 120 may be provided on the same layer and/or the same plane. For example, the first electrode 110 and the second electrode 120 may be formed on the base substrate 101. When an additional layer is provided on the base substrate 101, both the first electrode 110 and the second electrode 120 may be provided on the additional layer.

The cushion layer 130 may be disposed on the first electrode 110 and the second electrode 120 of the sensing unit 105 and form a touch pressure sensor together with the sensing unit 105. Permittivity of the cushion layer 130 may be changed by a user's touch. Information about pressure of the user's touch, i.e., information about intensity of the touch, may be provided by sensing changes in the permittivity.

The cushion layer 130 may be provided over the first electrode 110 and the second electrode 120 so as to overlap with the first electrode 110 and the second electrode 120.

The cushion layer 130 may be a component whose electrical characteristics are changed depending on the degree of deformation. The cushion layer 130 may include a material whose permittivity is changed by external pressure between the first electrode 110 and the second electrode 120.

According to one or more exemplary embodiments, the cushion layer 130 may include an insulator 130b and conductive particles 130a distributed in the insulator 130b.

The conductive particles 130a may include particles of a conductive oxide of a metal or a conductive nitride of a metal, or a conductive polymer. Examples of the metal may include zinc (Zn), aluminum (Al), scandium (Sc), chromium (Cr), manganese (Mn), iron (Fe), cobalt (Co), nickel (Ni), copper (Cu), indium (In), tin (Sn), yttrium (Y), zirconium (Zr), niobium (Nb), molybdenum (Mo), ruthenium (Ru), rhodium (Rh), palladium (Pd), gold (Au), silver (Ag), platinum (Pt), strontium (Sr), tungsten (W), cadmium (Cd), tantalum (Ta), titanium (Ti), or an alloy thereof. The conductive oxide may include indium tin oxide (ITO), indium zinc oxide (IGZO), aluminum-doped zinc oxide (AZO) coated, gallium indium zinc oxide (GIZO), zinc oxide (ZnO), or a mixture thereof. The conductive polymer may include, but not limited thereto, one of poly-3, 4-4-ethylenedioxythiophene/polystyrene sulfonate (PEDOT/PSS), polyaniline, polyacetylene and polyphenylene vinylene.

The insulator 130b may include an insulating material having elasticity so that the insulator 130b may be elastically deformed by the user's touch. The insulating material having elasticity may be deformed by external pressure (for example, pressure by a user's hand or a stylus) and return to its original shape when the external pressure is released. The insulating material having the elasticity may be provided as a porous polymer. For example, the insulating material having the elasticity may be provided as a foam, such as a sponge. In addition, the insulating material having the elasticity may include thermoplastic elastomers, polystyrene, polyolefin, polyurethane thermoplastic elastomers, polyamides, synthetic rubbers, polydimethylsiloxane, polybutadiene, polyisobutylene, polystyrene-butadienestyrene, polyurethanes, polychloroprene, polyethylene, silicone, or a combination thereof, but not limited thereto.

As for the conventional touch sensor, the first electrode 110 and the second electrode 120 may have a 2-layer configuration so that the first and second electrodes 110 and 120 may face each other with the cushion layer 130 interposed therebetween. However, according to one or more exemplary embodiments, the first electrode 110 and the second electrode 120 may be provided on the same layer, so that the size of the entire touch sensor 100 may be reduced.

In addition, when the touch sensor 100 is folded, the first electrode 110 and the second electrode 120 may be disposed on the same layer to reduce the entire thickness of the touch sensor 100 so that the touch sensor 100 may be prevented from being damaged by stress when the touch sensor 100 is folded.

Figure 3A:
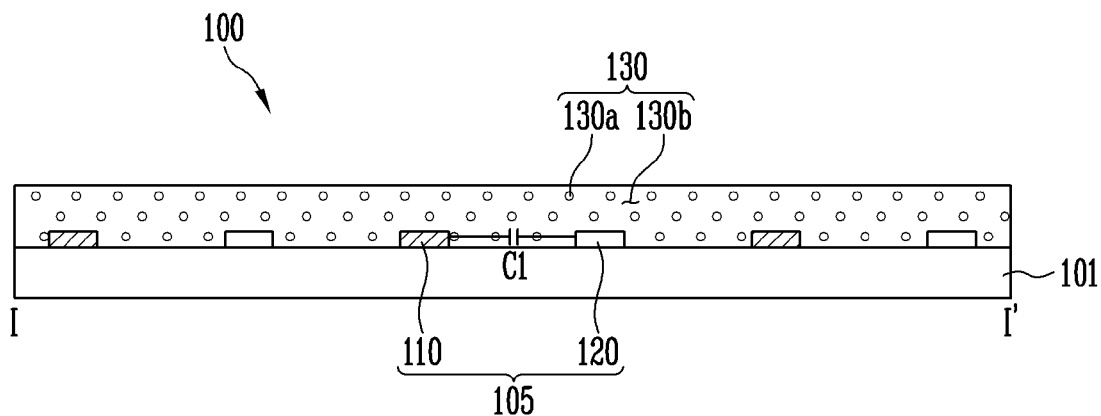
FIG. 3A, FIG. 3B, and FIG. 3C are respective cross-sectional views illustrating operations of a touch sensor according to one or more exemplary embodiments.
Figure 3B:
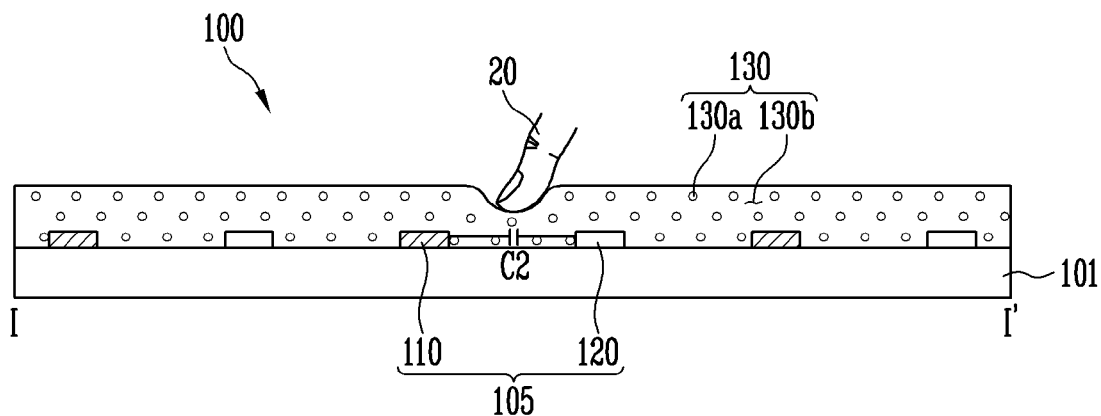
Figure 3C:
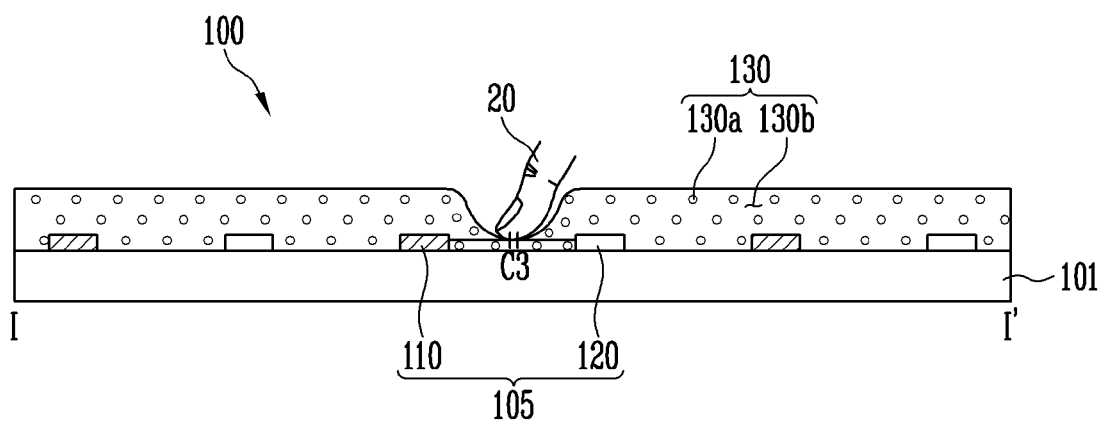

FIGS. 3A, 3B, and 3C illustrate operations of a touch sensor according to one or more exemplary embodiments. FIG. 3A illustrates the touch sensor when pressure is not applied by the user. FIG. 3B illustrates the touch sensor when pressure is slightly applied by the user. FIG. 3C illustrates the touch sensor when a large pressure is applied by the user.

Referring to FIGS. 3A, 3B, and 3C, in the touch sensor 100 according to one or more exemplary embodiments, the first electrode 110 and the second electrode 120 may be separated from each other with the cushion layer 130 interposed therebetween. The first electrode 110 and the second electrode 120 may be arranged on the base substrate 101. In other words, the first electrode 110 and the second electrode 120 may be disposed on the same layer.

When a user 20 applies pressure to the touch sensor 100, conductive particles 130a in the cushion layer 130 at a position corresponding to a region where the pressure is applied may move to the first and second electrodes 110 and 120, so that the permittivity of the cushion layer 130 may be changed. When the permittivity of the cushion layer 130 is changed, electrical characteristics of the touch sensor 100, e.g., capacitance, may be changed. Capacitance of the touch sensor 100 when pressure is not applied by the user 20 may be a first capacitance C1, capacitance of the touch sensor 100 when a small amount of pressure is applied by the user 20 may be a second capacitance C2, and capacitance of the touch sensor 100 when a large pressure is applied by the user 20 may be a third capacitance C3. The capacitance of the touch sensor 100 may be changed depending on changes in density of the conductive particles 130a of the cushion layer 130. When a large pressure is applied by the user 20, the conductive particles 130a in the cushion layer 130 at the position corresponding to the region where the pressure is applied may become denser in the area around the first electrode 110 and the second electrode 120, so that the third capacitance C3 between the first electrode 110 and the second electrode 120 may be changed by these conductive particles 130a. More specifically, the third capacitance C3 may be increased more than the first capacitance C1 and the second capacitance C2. As described above, the touch sensor 100 according to one or more exemplary embodiments may sense a touch position and a touch pressure by the user 20 based on the capacitance measured between the first electrode 110 and the second electrode 120 according to the changes in the permittivity of the cushion layer 130.

According to one or more exemplary embodiments, the touch sensor 100 may simultaneously or sequentially sense changes in the capacitance between the first electrode 110 and the second electrode 120, in addition to the changes in the permittivity of the cushion layer 130. Therefore, the touch sensor 100 may easily sense a touch position and intensity of a touch pressure when the user 20 touches the touch sensor 100.

According to one or more exemplary embodiments, when pressure is applied to the touch sensor 100 by using a pen or the like instead of the user 20's hand, the density of the conductive particles 130a in the cushion layer 130 may be changed, so that the permittivity of the cushion layer 130 may be changed. According to the changes in the permittivity of the cushion layer 130, the touch sensor 100 may sense the changes in the capacitance of the region wherein the pressure is applied.

Figure 4A:
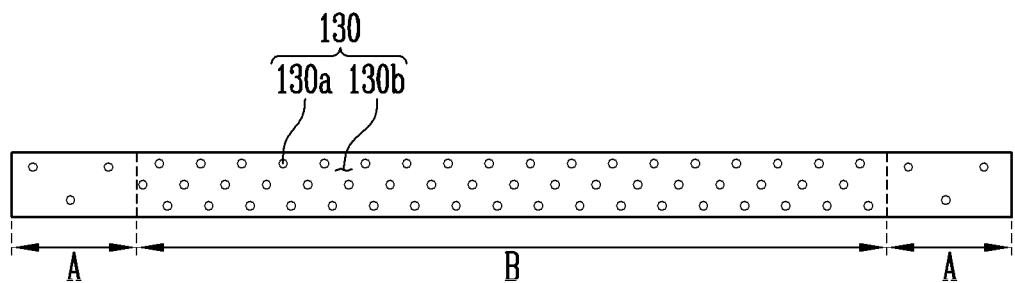
FIG. 4A and FIG. 4B are cross-sectional views illustrating conductive particles distributed in a cushion layer of the touch sensor shown in FIG. 1.
Figure 4B:
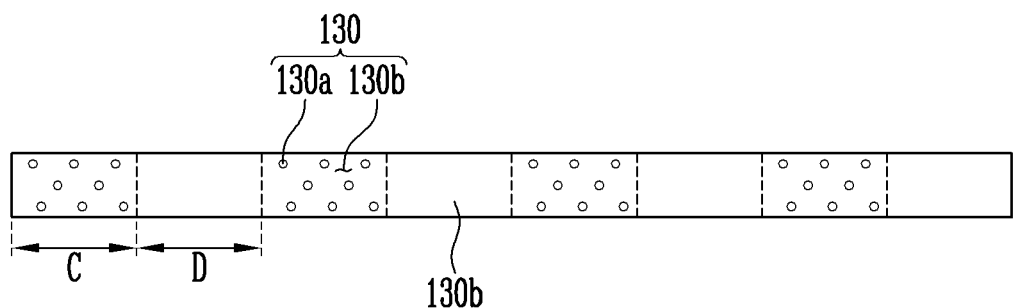

FIGS. 4A and 4B are cross-sectional views illustrating conductive particles distributed in the cushion layer of the touch sensor shown in FIG. 1.

First, referring to FIGS. 1 and 4A, the cushion layer 130 may include the insulator 130b and the conductive particles 130a distributed in the insulator 130b.

The cushion layer 130 may be divided into edge regions A corresponding to both end portions, and a central region B disposed between the edge regions A. The density of the conductive particles 130a in the cushion layer 130 corresponding to the central region B may be different from that of the conductive particles 130a of the cushion layer 130 corresponding to the edge regions A. For example, the density of the conductive particles 130a in the cushion layer 130 corresponding to the central region B may be greater than that of the conductive particles 130a in the cushion layer 130 corresponding to the edge regions A. However, the disclosure is not limited thereto, and the reverse is also possible.

Referring to FIGS. 1 and 4B, the cushion layer 130 may include the insulator 130b and the conductive particles 130a distributed in the insulator 130b.

To improve sensitivity by a user's touch and equalize the sensitivity by the touch according to each region, the cushion layer 130 may be divided into a region including the conductive particles 130a and a region not including the conductive particles 130a. More specifically, the cushion layer 130 may be divided into a first region C where the conductive particles 130a are distributed in the insulator 130b and a second region D where only the insulator 130b is disposed.

The cushion layer 130 may be formed of material including the conductive particles 130a and material not including the conductive particles 130a by screen printing. However, the invention is not limited thereto. For example, the cushion layer 130 may be formed using material including the conductive particles 130a and material not including the conductive particles 130a by inkjet printing.

Figure 5:
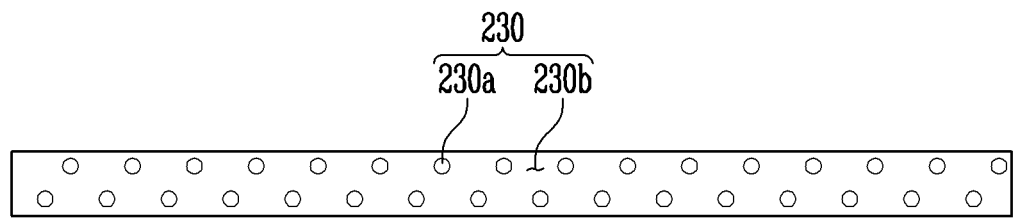
FIG. 5 is a cross-sectional view illustrating a cushion layer according to a second exemplary embodiment in the touch sensor shown in FIG. 1.

FIG. 5 is a cross-sectional view illustrating a cushion layer according to a second exemplary embodiment in the touch sensor shown in FIG. 1.

Referring to FIGS. 1 and 5, a cushion layer 230 according to a second exemplary embodiment may include a base layer 230b and bubbles 230a distributed in the base layer 230b. The base layer 230b may be an insulator. The bubbles 230a may include an air layer or a cavity. The base layer 230b and the bubbles 230a may have different permittivities from each other. For example, the base layer 230b may have a greater permittivity than the bubbles 230a. However, the disclosure is not limited thereto, and the reverse is also possible. In other words, the bubbles 230a may have a greater permittivity than the base layer 230b. When the bubbles 230a and the base layer 230b have different permittivities, the permittivity of the cushion layer 230 may be easily changed when pressure is externally applied.

Figure 6:
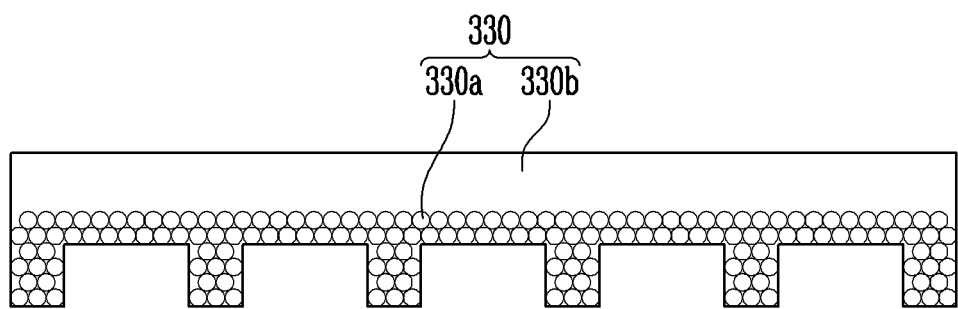
FIG. 6 is a cross-sectional view illustrating a cushion layer according to a third exemplary embodiment in the touch sensor shown in FIG. 1.

FIG. 6 is a cross-sectional view illustrating a cushion layer according to a third exemplary embodiment in the touch sensor shown in FIG. 1.

Referring to FIGS. 1 and 6, a cushion layer 330 according to a third exemplary embodiment may include an insulator 330b and conductive particles 330a implanted into the insulator 330b. The insulator 330b may include an elastomer such as rubber. The conductive particles 330a may include metallic particles doped or implanted into the insulator 330b.

The conductive particles 330a may include metallic particles such as zinc (Zn), aluminum (Al), scandium (Sc), chromium (Cr), manganese (Mn), iron (Fe), cobalt (Co), nickel (Ni), copper (Cu), indium (In), tin (Sn), yttrium (Y), zirconium (Zr), niobium (Nb), molybdenum (Mo), ruthenium (Ru), rhodium (Rh), palladium (Pd), gold (Au), silver (Ag), platinum (Pt), strontium (Sr), tungsten (W), cadmium (Cd), tantalum (Ta), and titanium (Ti).

The insulator 330b may be partially patterned so that the shape thereof may be easily changed by externally applied pressure.

The cushion layer 330 may be formed by metal ion implantation by implanting the conductive particles 330a into the insulator 330b using plasma after the insulator 330b is patterned. However, the invention is not limited thereto. For example, the cushion layer 330 may be formed by injecting the conductive (i.e., metallic) particles 330a into the insulator 330b and patterning the insulator 330b.

Figure 7:
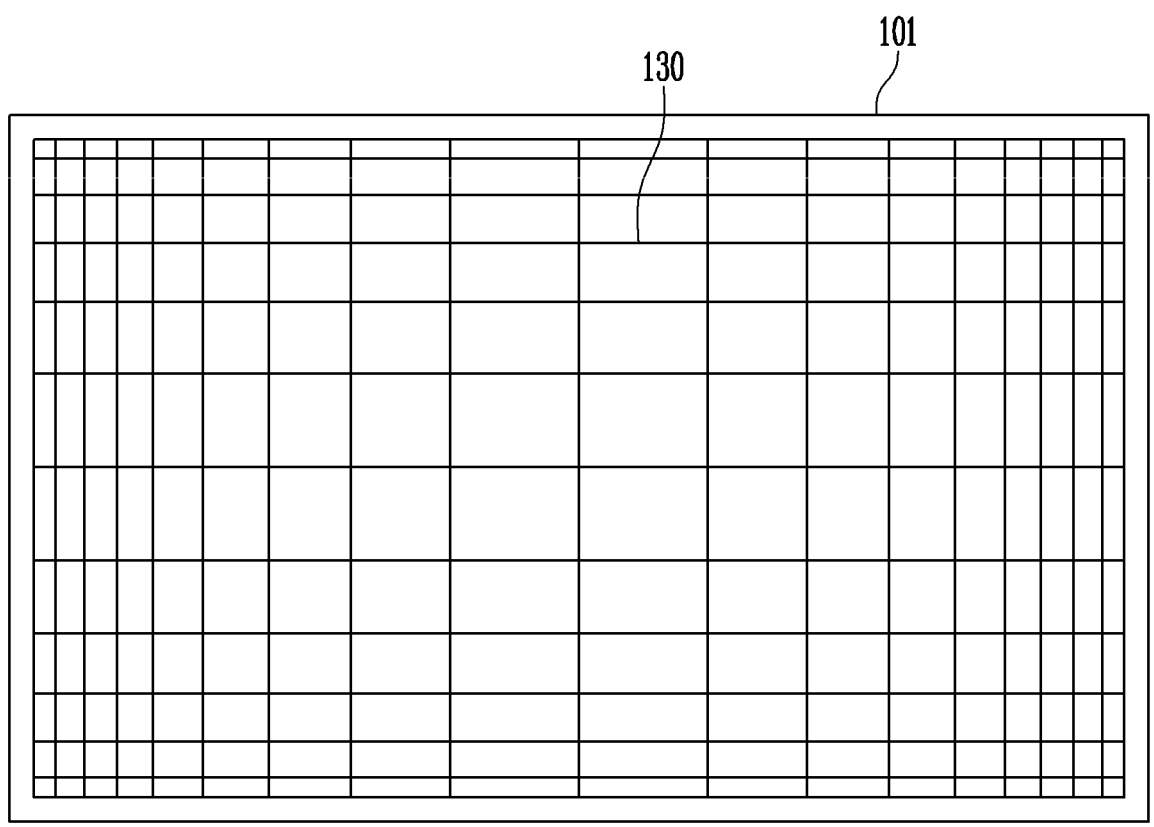
FIG. 7 is a plan view illustrating a touch sensor arranged on a base substrate according to one or more exemplary embodiments.

FIG. 7 is a plan view illustrating a touch sensor disposed on a base substrate in a touch sensor according to one or more exemplary embodiments. A plurality of sensing units may be arranged on the base substrate. However, for illustrative purposes, the plurality of sensing units are not illustrated.

Referring to FIG. 7, cushion layers 130 may be provided on the base substrate 101. The central region of the base substrate 101 may have a higher touch frequency than the edge regions of the base substrate 101. Therefore, to equalize the sensitivity by the touch according to each region, the distance between neighboring cushion layers 130 may be reduced toward the edge portions of the base substrate 101 from the central portion of the base substrate 101.

The sensitivity by the touch according to each region may be equalized by setting different densities for the conductive particles 130a, as shown in FIG. 2, distributed in the cushion layer 130 in the central region of the base substrate 101 and in the cushion layer 130 in the edge region of the base substrate 101. For example, the density of the conductive particles 130a distributed in the cushion layer 130 at the edge of the base substrate 101 may be greater than that of the conductive particles 130a distributed in the cushion layer 130 at the central region of the base substrate 101. However, the invention is not limited thereto, and the reverse is also possible.

Additionally, to make the sensitivity by the touch uniform in each region, the width between the first region C of the cushion layer 130, as shown in FIG. 4B, in which the conductive particles 130a, as shown in FIG. 2, are distributed and the second region D, as shown in FIG. 4B, in which the conductive particles 130a are not distributed, may be controlled. More specifically, the width of the second region D of the cushion layer 130 may decrease from the central region of the base substrate 101 toward the edge region of the base substrate 101.

In the above-described exemplary embodiment, a sensing unit may be provided to have the following configuration.

Figure 8:
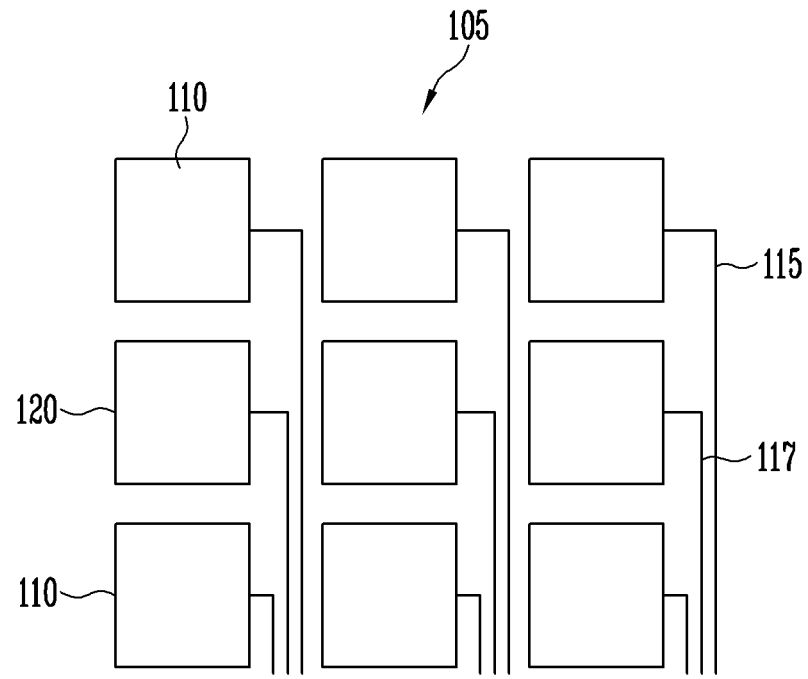
FIG. 8 is a plan view illustrating a portion of a sensing unit when the sensing unit is a self-capacitance sensing unit in a touch sensor according to one or more exemplary embodiments.

FIG. 8 is a plan view illustrating a portion of a sensing unit of a touch sensor according to one or more exemplary embodiments when the sensing unit is a self-capacitance sensing unit. When the touch sensor is a self capacitance touch sensor, a first electrode and a second electrode may be denoted by the same reference numeral. However, for convenience of explanation the first electrode and the second electrode may be denoted by different reference numerals in FIG. 8.

Referring to FIG. 8, the sensing unit 105 may include sensing electrodes, to which a predetermined voltage is applied, and the sensing electrodes may be arranged in a matrix format. The sensing electrodes may include first electrodes 110 and second electrodes 120. The sensing unit 105 may include first connection lines 115 coupled to the first electrodes 110, second connection lines 117 coupled to the second electrodes 120, and a predetermined voltage may be provided to the sensing electrodes through the first and second connection lines 115 and 117.

When the user touches the sensing unit 105, capacitance of a sensing electrode in the touched region may change. By detecting changes in the predetermined voltage caused by the change in the capacitance, whether or not a touch is made at a predetermined position may be determined.

Figure 9:
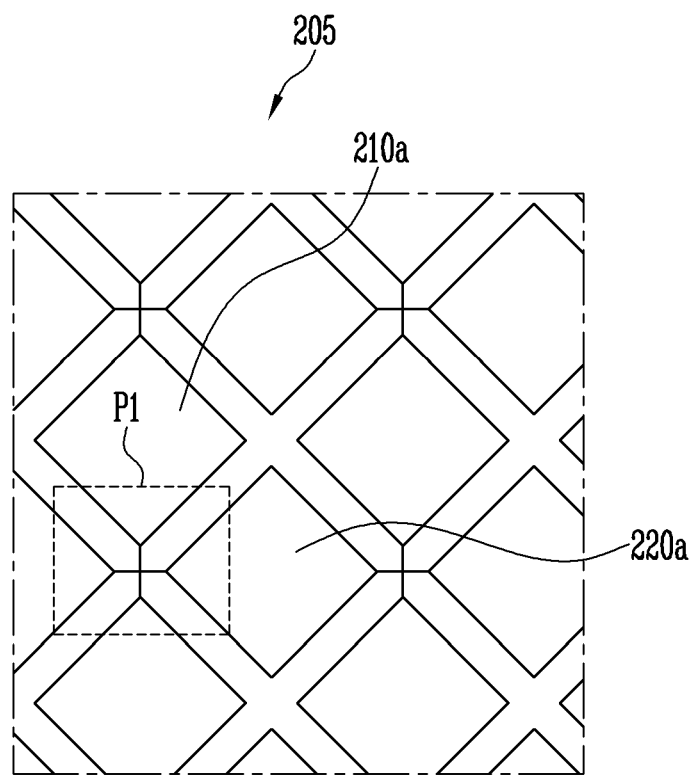
FIG. 9 is a plan view illustrating a portion of a sensing unit when the sensing unit is a mutual capacitance sensing unit in a touch sensor according to one or more exemplary embodiments.
Figure 10:
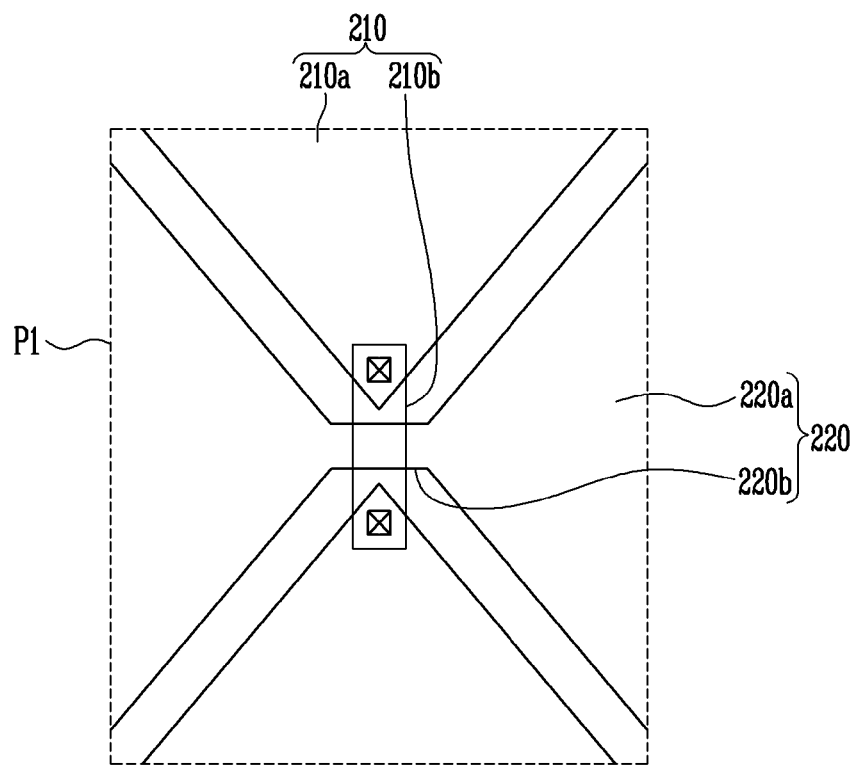
FIG. 10 is an enlarged plan view illustrating a portion "P1" of FIG. 9.

FIG. 9 is a plan view illustrating a portion of a sensing unit of a touch sensor, according to one or more exemplary embodiments, when the sensing unit is a mutual capacitance sensing unit. FIG. 10 is a plan view illustrating a portion "P1" shown in FIG. 9.

Referring to FIGS. 9 and 10, a sensing unit 205 may include sensing electrodes and connection lines (not illustrated) coupled to the sensing electrodes, and electrically connected to an external driving circuit (not illustrated).

The sensing electrodes may include first electrodes 210 and second electrodes 220. The first electrodes 210 may include first sensing electrodes 210a extending in a first direction and first bridge patterns 210b connecting the first sensing electrodes 210a to each other. The second electrodes 220 may include second sensing electrodes 220a extending in a second direction crossing the first direction and second bridge patterns 220b connecting the second sensing electrodes 220a to each other.

The first sensing electrodes 210a and the second sensing electrodes 220a may be formed into independent patterns that are not coupled to each other. When the first sensing electrodes 210a are coupled to each other by the first bridge patterns 210b, formed integrally with the first sensing electrode 210a, the second sensing electrodes 220a may be coupled to each other by the second bridge patterns 220b which are separated by an insulating layer (not illustrated).

One of the first sensing electrodes 210a and the second sensing electrodes 220a may serve as a driving electrode and the other sensing electrode may serve as a sensing electrode.

Figure 11A:
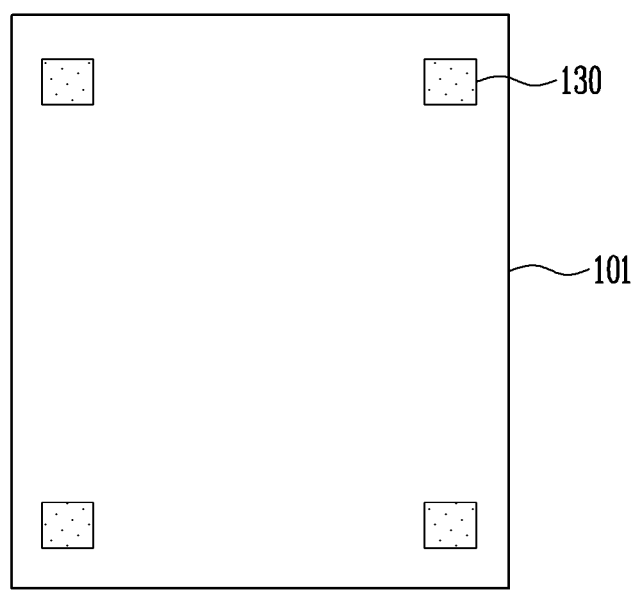
FIG. 11A, FIG. 11B, and FIG. 11C are plan views illustrating the arrangement of a cushion layer according to one or more exemplary embodiments.
Figure 11B:
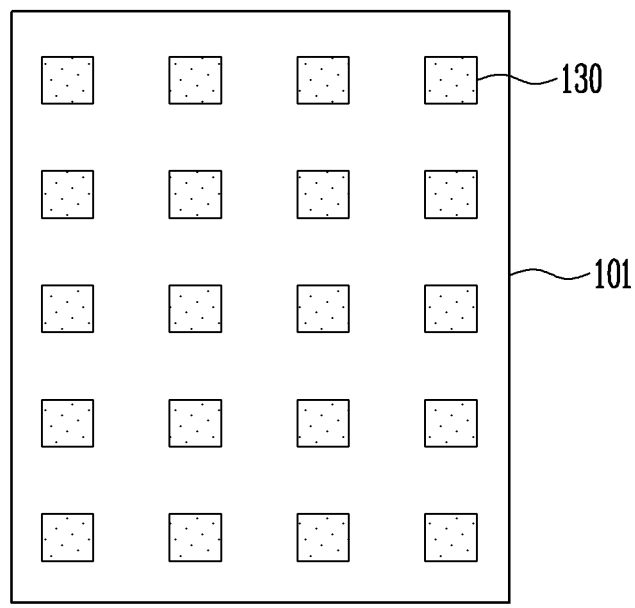
Figure 11C:
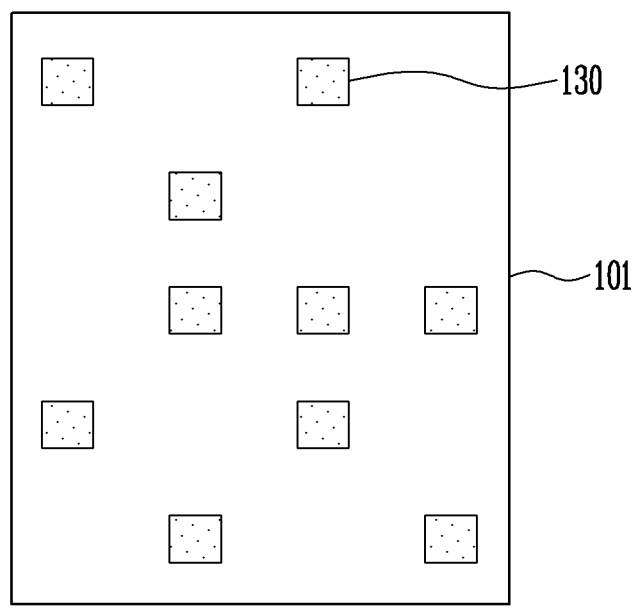

According to one or more exemplary embodiments, the cushion layers of the touch sensor may be arranged in various configurations. FIGS. 11A to 11C are diagrams illustrating arrangements of cushion layers according to one or more exemplary embodiments.

FIGS. 11A to 11C are plan views illustrating arrangements of cushion layers according to one or more exemplary embodiments. As illustrated in FIGS. 11A to 11C, a plurality of sensing units may be arranged over the base substrate 101. However, for convenience of explanation, the sensing units are not illustrated. The cushion layers may be arranged on a portion or the entirety of the sensing units.

The cushion layers may be arranged at various positions and/or varying densities per unit area depending on the size of the touch sensor or a user's predicted propensity of touching a specific region of the touch sensor. For example, when a user is likely to touch one region more frequently than another region, more cushion layers may be arranged in the region with higher touch frequency than in another region with lower touch frequency.

However, the disclosure is not limited thereto, and the reverse is also possible. For example, to equalize the touch sensitivity of the region with the higher frequency and the region with the lower frequency, more cushion layers may be arranged in the region with the lower touch frequency than in the region with the higher touch frequency.

As described above, the number of cushion layers may vary depending on each region and according to the intended effects desired.

In addition, for example, when the touch sensor is employed in an electronic device such as a display device, cushion layers may be arranged at various positions and/or densities per unit area in consideration of combination with another electronic device. As for the display device, a region where an image is displayed and a region where an image is not displayed may be provided. The cushion layers may be arranged in the region where the image is displayed. A few or no cushion layers may be arranged in the region where the image is not displayed. In addition, in the region where the image is displayed, the cushion layers may be arranged at various positions and/or densities in line with the image.

First, referring to FIG. 11A, the cushion layers 130 may be arranged at the edges of the base substrate 101. In addition, referring to FIG. 11B, the cushion layers 130 may be arranged at regular intervals on the base substrate 101.

Referring to FIG. 11C, the cushion layers 130 may be irregularly or randomly arranged on the base substrate 101.

Figure 12:
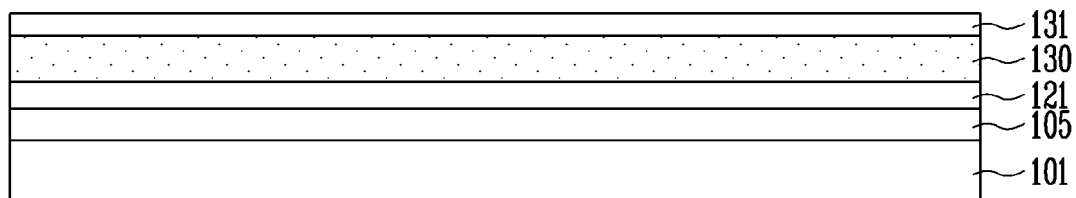
FIG. 12 is a cross-sectional view illustrating a touch sensor according to one or more exemplary embodiments.

FIG. 12 is a cross-sectional view illustrating a touch sensor according to one or more exemplary embodiments.

Referring to FIG. 12, in a touch sensor according to one or more exemplary embodiments, a second adhesive layer 131 may be provided on one surface (for example, a front surface) of the cushion layer 130 to cover the cushion layer 130. The second adhesive layer 131 may include an optically clear adhesive (OCA). When the second adhesive layer 131 includes the optically clear adhesive, it may be easy to attach the second adhesive layer 131 to another component. The second adhesive layer 131 may be flexible and elastic, so that the second adhesive layer 131 may be partially deformed and easily revert to the original shape.

In addition, a first adhesive layer 121 may be provided on another side (for example, a rear surface) of the cushion layer 130 to couple the sensing unit 105 and the cushion layer 130 to each other. The first adhesive layer 121 may include substantially the same material as the second adhesive layer 131, but the present disclosure is not limited thereto.

In the touch sensor 100 according to one or more exemplary embodiments, the first electrode 110 and the second electrode 120 of the sensing unit 105 may be provided on the same layer, so that the entire thickness of the touch sensor 100 may be reduced.

A touch sensor according to one or more exemplary embodiments may be employed in various electronic devices. an exemplary embodiment may be employed in a display device and used as one of the input devices. At least a portion of the display device may be flexible. At least a portion of the display device may be changed into various shapes. For example, the display device may be at least partially bent, folded, or rolled.

FIGS. 13 to 17 are cross-sectional views illustrating a display device in which a touch sensor according to one or more exemplary embodiments is employed.

Figure 13:
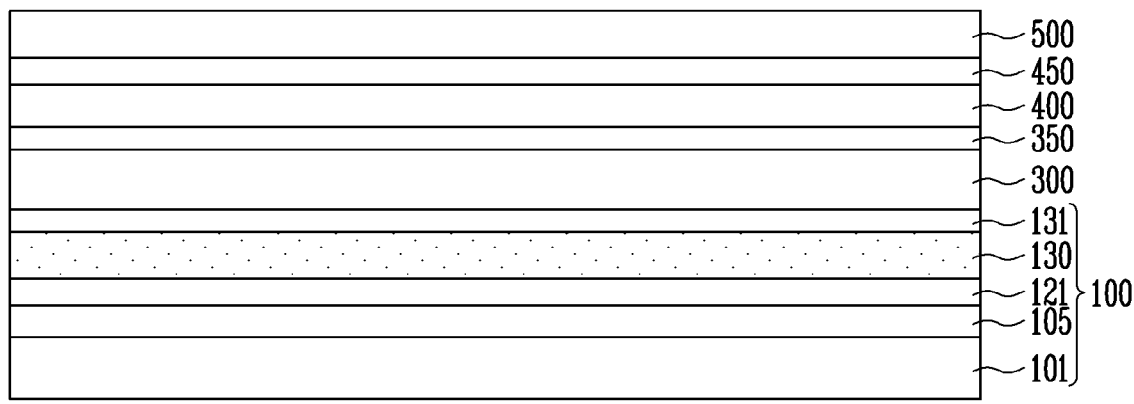
FIG. 13, FIG. 14, FIG. 15, FIG. 16, and FIG. 17 are cross-sectional views illustrating a display device using a touch sensor according to one or more exemplary embodiments.

Referring to FIG. 13, a display device may include a display panel 300 displaying an image on a front surface thereof, the touch sensor 100 provided on a rear surface of the display panel 300, a polarizer 400 provided on the front surface of the display panel 300, and a window 500.

The display panel 300 may include a plurality of pixels and provide a user with a predetermined image.

The display panel 300 may display an image on at least one surface thereof. According to one or more exemplary embodiments, for convenience of explanation, an image is displayed on the front surface of the display panel 300. However, the front surface on which the image is displayed may be flat or curved with a predetermined curvature. In addition, the surface on which an image is displayed may be flat and at the same time, foldable or rollable.

The display panel 300 is not particularly limited as long as it displays an image. For example, the display panel 300 may be an organic light-emitting display panel.

The touch sensor 100 may be attached to the display panel 300 with the second adhesive layer 131 interposed between the touch sensor 100 and the rear surface of the display panel 300.

As viewed on the plane, the touch sensor 100 may at least partially overlap with the display panel 300. According to one or more exemplary embodiments, the touch sensor 100 may substantially overlap with the entire area where an image is displayed on the display panel 300.

The touch sensor 100 may include the base substrate 101, the sensing unit 105 provided on the base substrate 101, and the cushion layer 130 disposed on the sensing unit 105. In addition, the touch sensor 100 may further include the second adhesive layer 131 and the first adhesive layer 121 coupling the cushion layer 130 and the sensing unit 105. The base substrate 101 may function as a protective film protecting a rear surface of the display panel 300.

The sensing unit 105 may include the first electrodes 110 and the second electrodes 120 which are provided on the base substrate 101 and separated from each other as shown in FIG. 2.

According to one or more exemplary embodiments, the sensing unit 105 may face the display panel 300. When the cushion layer 130 has first and second surfaces opposite to each other, the sensing unit 105 may be provided on the first surface of the cushion layer 130 and the second surface of the cushion layer 130 may face the rear surface of the display panel 300.

The polarizer 400 may be arranged over the front surface of the display panel 300 with a third adhesive layer 350 interposed therebetween.

The window 500 may be provided over the polarizer 400 with a fourth adhesive layer 450 interposed therebetween. The window 500 may be disposed on the front surface of the display panel 300, i.e., a side where an image is displayed, so as to protect the display panel 300. The window 500 may be located at the outermost edge of the upper part of the display device to protect the display device from external stress or impact.

The polarizer 400 and the window 500 may be removed if necessary.

In the above-described display device, since the entire thickness of the touch sensor 100 is reduced in comparison with the conventional touch sensor, damage to the display device caused by stress applied when folded may be reduced.

Figure 14:
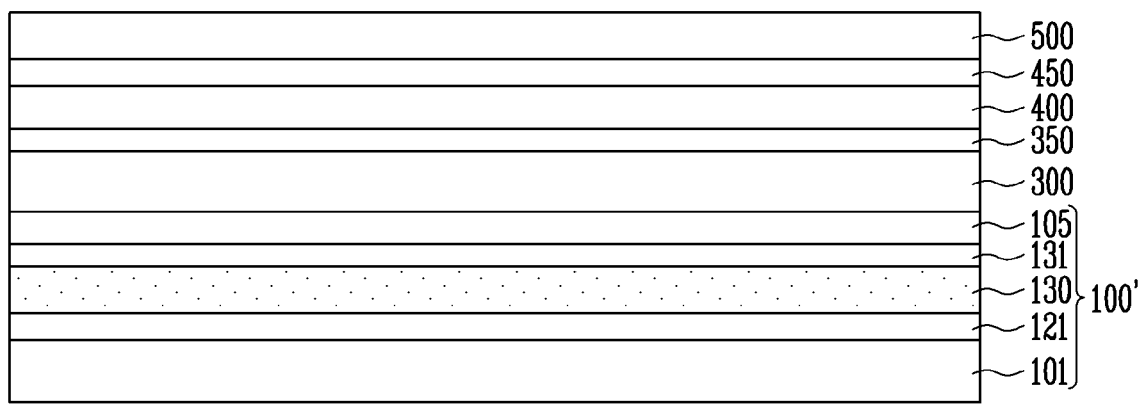

According to one or more exemplary embodiments, the touch sensor may be arranged in the display device in a different manner. Referring to FIG. 14, the display device may include the display panel 300, a touch sensor 100' disposed on a rear surface of the display panel 300, the polarizer 400 disposed on a front surface of the display panel 300, and the window 500. Only the differences between the display device shown in FIG. 14 and the display device according to the earlier described embodiment will be mainly described to avoid redundancy.

The touch sensor 100' may include the base substrate 101, the cushion layer 130 disposed on the base substrate 101, and the sensing unit 105 disposed on the cushion layer 130. In addition, the touch sensor 100' may further include the first adhesive layer 121 arranged between the base substrate 101 and the cushion layer 130 and the second adhesive layer 131 arranged between the cushion layer 130 and the sensing unit 105.

According to one or more exemplary embodiments, the sensing unit 105 of the touch sensor 100' may be provide between the rear surface of the display panel 300 and the cushion layer 130. When the cushion layer 130 has first and second surfaces opposite to each other and the sensing unit 105 is disposed on the first surface, the first surface of the cushion layer 130 may face the rear surface of the display panel 300.

Figure 15:
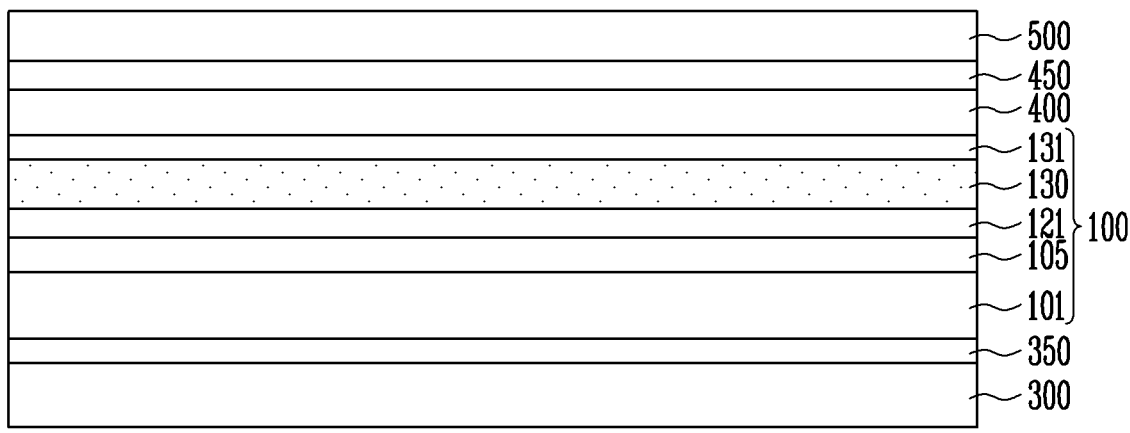

According to one or more exemplary embodiments, the display panel and the touch sensor may be arranged in different configurations in the display device. Referring to FIG. 15, the display device may include the display panel 300, the touch sensor 100 disposed on the front surface of the display panel 300, the polarizer 400 disposed on the touch sensor 100, and the window 500. Only the differences between the display device as shown in FIG. 15 and the display devices according to the above-described embodiments will be mainly described, in order to avoid redundancy.

The touch sensor 100 may include the base substrate 101, the sensing unit 105 disposed on the base substrate 101, and the cushion layer 130 disposed on the sensing unit 105. In addition, the touch sensor 100 may include the first adhesive layer 121 provided between the sensing unit 105 and the cushion layer 130, and the second adhesive layer 131 provided between the cushion layer 130 and the polarizer 400.

The display panel 300 may be disposed on the rear surface of the touch sensor 100 by the third adhesive layer 350.

According to one or more exemplary embodiments, the sensing unit 105 of the touch sensor 100 may be provided between the front surface of the display panel 300 and the cushion layer 130. When the cushion layer 130 has first and second surfaces opposite to each other and the sensing unit 105 is provided on the first surface, the first surface of the cushion layer 130 may face the front surface of the display panel 300.

The polarizer 400 may be arranged on the second surface of the cushion layer 130 with the second adhesive layer 131 interposed therebetween. The window 500 may be provided on the polarizer 400 with the fourth adhesive layer 450 interposed therebetween.

A protection member may be further disposed on the rear surface of the display panel 300 to cover the rear surface of the display panel 300.

Figure 16:
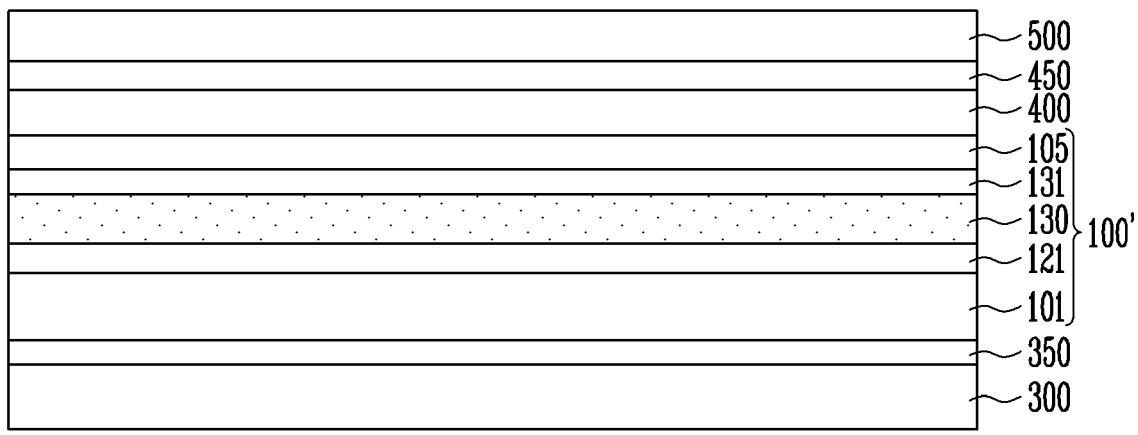

According to one or more exemplary embodiments, the touch sensor may be arranged in a different configuration in the display device. Referring to FIG. 16, the display device may include the display panel 300, the touch sensor 100' disposed on the front surface of the display panel 300, the polarizer 400 disposed on a front surface of the touch sensor 100', and the window 500. Only the differences between the display device shown in FIG. 16 and the display devices according to the above-described embodiments will be mainly described to avoid redundancy.

The touch sensor 100' may include the base substrate 101, the cushion layer 130 disposed on the base substrate 101, and the sensing unit 105 disposed on the cushion layer 130. In addition, the touch sensor 100' may include the first adhesive layer 121 arranged between the base substrate 101 and the cushion layer 130 and the second adhesive layer 131 arranged between the cushion layer 130 and the sensing unit 105.

The display panel 300 may be disposed on a rear surface of the touch sensor 100' by the third adhesive layer 350.

According to one or more exemplary embodiments, the sensing unit 105 of the touch sensor 100' may be provided between the polarizer 400 and the cushion layer 130. When the cushion layer 130 has first and second surfaces opposite to each other and the sensing unit 105 is disposed on the first surface, the second surface of the cushion layer 130 may face the front surface of the display panel 300.

The polarizer 400 may be disposed on the sensing unit 105 with the second adhesive layer 131 interposed therebetween. The window 500 may be disposed on the polarizer 400 with the fourth adhesive layer 450 interposed therebetween.

A protection member may be further disposed on the rear surface of the display panel 300 to cover the rear surface of the display panel 300.

Figure 17:
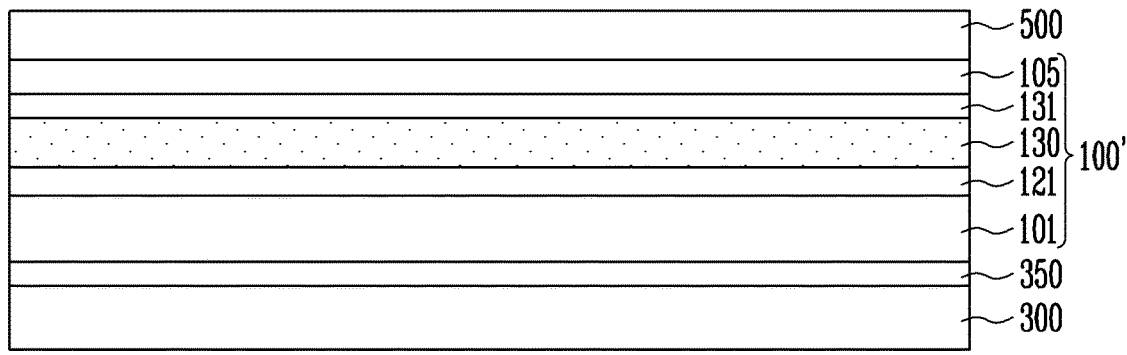

According to one or more exemplary embodiments, the touch sensor may be applicable to a display device from which a polarizer is removed. Referring to FIG. 17, according to one or more exemplary embodiments, the display device may include the display panel 300, the touch sensor 100' disposed on the front surface of the display panel 300, and the window 500 disposed on the touch sensor 100'. Only the differences between the display device as shown in FIG. 17 and the display devices according to the above-described embodiments will be mainly described to avoid redundancy.

The display panel 300 may be disposed on the rear surface of the touch sensor 100' by the third adhesive layer 350.

The touch sensor 100' may include the base substrate 101, the cushion layer 130 disposed on the base substrate 101, and the sensing unit 105 disposed on the cushion layer 130. In addition, the touch sensor 100' may further include the first adhesive layer 121 arranged between the base substrate 101 and the cushion layer 130 and the second adhesive layer 131 arranged between the cushion layer 130 and the sensing unit 105.

The sensing unit 105 may be directly disposed under the window 500 to improve touch sensitivity. Surfaces of the first electrodes 110 and the second electrodes 120 included in the sensing unit 105 may be blackened so as not to be viewed due to external light.

The above blackening method may include a method using light interference and a method using light absorption. According to the method using light interference, the first and second electrodes 110 and 120 may have a multilayer structure in which a plurality of metal layers having different reflectances are sequentially stacked to reflect externally incident light, so that the first electrode 110 and the second electrode 120 may not be viewed. According to the method using the light absorption, the surfaces of the first electrode 110 and the second electrode 120 may be coated with a light absorption material to absorb externally incident light so that the first electrodes 110 and the second electrodes 120 may not be viewable.

Figure 18:
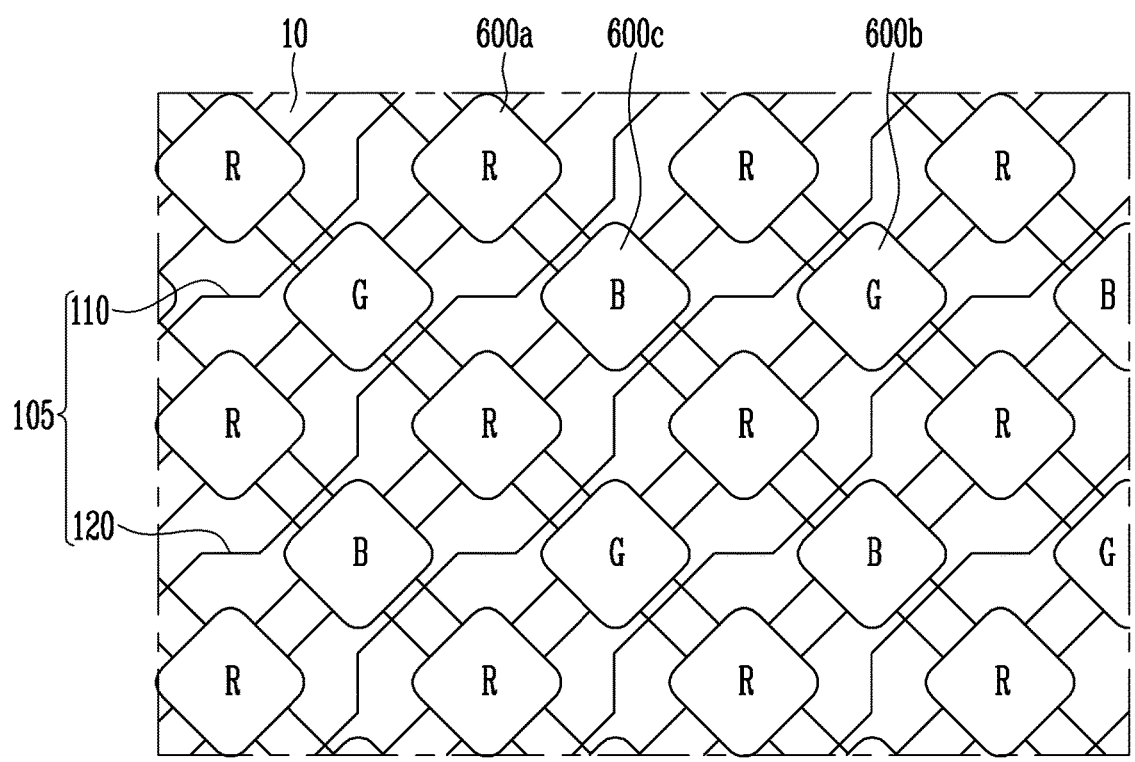
FIG. 18 is a schematic plan view illustrating a portion of a display panel of the display device shown in FIG. 17.

FIG. 18 is a schematic plan view illustrating a portion of the display panel of the display device shown in FIG. 17.

Referring to FIGS. 17 and 18, the display panel may include a plurality of first pixels 600*a*, a plurality of second pixels 600*b*, and a plurality of third pixels 600*c*. For convenience of explanation, the first pixels 600*a*, the second pixels 600*b*, and the third pixels 600*c* are illustrated to have the same areas. However, the invention is not limited thereto. The shapes of the first, second, and third pixels 600*a*, 600*b*, and 600*c* are not limited as illustrated in FIG. 18. For example, the first, second and pixels 600*a*, 600*b*, and 600*c* may have various shapes such as a circle, an oval, and a polygon.

Each of the first pixels 600*a* may include a first light-emitting region R emitting red light, each of the second pixels 600*b* may include a second light-emitting region G emitting green light, and each of the third pixels 600*c* may include a third light-emitting region B emitting blue light.

Another component (e.g., pixel defining layer 10) may be arranged between the first pixels 600*a*, the second pixels 600*b* and the third pixels 600*c*.

In addition, the display panel may include the plurality of first electrodes 110 and the plurality of second electrodes 120 which are located on the light-emitting regions R, G, and B, and do not overlap with the light-emitting regions R, G, and B. Since the first electrode 110 and the second electrodes 120 do not overlap with the light-emitting regions R, G, and B of the display panel, an aperture ratio of the display panel may be increased to increase light transmittance.

The display device according to one or more exemplary embodiments may be applicable to various electronic devices. For example, the display device may be applicable to various types of wearable devices, such as televisions, notebooks, cellular phones, smartphones, smart pads (PD), portable multimedia players (PMP), personal digital assistants (PDA), navigations, and smartwatches.

According to one or more exemplary embodiments, a touch sensor detecting a touch position and a touch pressure may be provided.

According to one or more exemplary embodiments, a display device having the above touch sensor may be provided.

According to one or more exemplary embodiments, a display device having improved reliability when folded may be provided.

Although certain exemplary embodiments and implementations have been described herein, other embodiments and modifications will be apparent from this description. Accordingly, the inventive concept is not limited to such embodiments, but rather to the scope of the presented claims and various obvious modifications and equivalent arrangements.

What is claimed is:

1. A touch sensor, comprising:
a base substrate having a central region and edge regions;
a plurality of sensing units, each sensing unit comprising a first electrode and a second electrode provided on a same layer of the base substrate and not overlapping with each other, wherein a capacitance of the each sensing unit is changed by a user's touch; and
a plurality of cushion layers disposed on the plurality of sensing units, and configured to have a permittivity change in response to a pressure of the user's touch,
wherein the each cushion layer comprises an insulator and conductive particles, and
the insulator comprises an elastic material elastically deformed by the pressure of the user's touch,
wherein the distance between adjacent cushion layers varies in a direction toward the edge regions of the base substrate from the central region of the base substrate.

2. The touch sensor of claim 1, wherein
when the pressure of the user's touch is applied, a density of the conductive particles in the cushion layer is changed at a position corresponding to a region where the pressure of the user's touch is applied, so that the permittivity of the cushion layer is changed.

3. The touch sensor of claim 2, wherein
a position of the user's touch and the pressure of the user's touch are detected based on a change in the permittivity of the cushion layer.

4. The touch sensor of claim 1, wherein
the conductive particles comprise a conductive polymer.

5. The touch sensor of claim 1, wherein
the each cushion layer comprises a first region where the conductive particles are distributed in the insulator and a second region comprising only the insulator.

6. The touch sensor of claim 1, wherein
the density of conductive particles distributed in the cushion layer in the central region is different from that of the cushion layer in the edge regions.

7. The touch sensor of claim 1, wherein
the each cushion layer comprises various shapes depending on a predicted propensity of touching a specific region.

8. The touch sensor of claim 1, wherein
the plurality of sensing units are arranged in a matrix format, and
each of the sensing units further comprises connection lines coupled to the first and second electrodes, respectively.

9. The touch sensor of claim 1, wherein
the first and second electrodes comprise a same material.

10. The touch sensor of claim 9, wherein
the first electrode comprises first branch portions,
the second electrode comprises second branch portions, and
the first branch portions and the second branch portions are alternately arranged.

11. The touch sensor of claim 1, wherein
the each sensing unit comprises a self-capacitance sensing electrode.

12. The touch sensor of claim 1, wherein
the each sensing unit comprises a mutual capacitance sensing electrode.

13. The touch sensor of claim 1, wherein
the each cushion layer comprises an elastomer and metallic particles doped into the elastomer.

14. The touch sensor of claim 1, wherein the distance between adjacent cushion layers is reduced in the direction toward the edge regions of the base substrate from the central region of the base substrate.

15. A touch sensor, comprising:
a base substrate having a central region and edge regions;
a plurality of sensing units, each sensing unit comprising a first electrode and a second electrode provided on a same layer of the base substrate and not overlapping with each other, wherein a capacitance of the each sensing unit is changed by a user's touch; and a plurality of cushion layers disposed on the plurality of sensing units, wherein a permittivity of the cushion layer is configured to change depending on a pressure of the user's touch,
wherein the cushion layer comprises a base layer having a first permittivity and
a cavity distributed in the base layer having a second permittivity which is different from the first permittivity,
wherein the distance between adjacent cushion layers varies in a direction toward the edge regions of the base substrate from the central region of the base substrate.

16. The touch sensor of claim 15, wherein the distance between adjacent cushion layers is reduced in the direction toward the edge regions of the base substrate from the central region of the base substrate.

17. A display device, comprising:
a display panel having a front surface on which an image is displayed; and
a touch sensor provided on at least one surface of the display panel and detecting a touch position and a touch pressure,
wherein the touch sensor comprises:
   a base substrate having a central region and edge regions;
   a plurality of sensing units, each sensing unit comprising a first electrode and a second electrode provided on a same layer and not overlapping with each other, wherein a capacitance of the each sensing unit is changed by a touch made by a user; and
   a plurality of cushion layers disposed on the plurality of sensing units, wherein a permittivity of the cushion layer is configured to change in response to a pressure of the user's touch,
      wherein the each cushion layer comprises an insulator and conductive particles and the insulator comprises an elastic material elastically deformed by the touch pressure,
   wherein the distance between adjacent cushion layers varies in a direction toward the edge regions of the base substrate from the central region of the base substrate.

18. The display device of claim 17, further comprising an adhesive member provided between the display panel and the base substrate to couple the display panel and the base substrate to each other,
   wherein the sensing units and the cushion layers are provided on a first surface of the base substrate.

19. The display device of claim 18, wherein the each cushion layer comprises a first surface on which the each sensing unit is provided and a second surface facing the first surface, and
   a first surface of the display panel and the second surface of the each cushion layer face each other.

20. The display device of claim 19, further comprising a polarizer disposed on a second surface of the display panel.

21. The display device of claim 20, further comprising a window disposed on the polarizer.

22. The display device of claim 19, further comprising a polarizer disposed on the first surface of the each cushion layer.

23. The display device of claim 22, further comprising a window disposed on the polarizer.

24. The display device of claim 19, further comprising a window disposed on the first surface of the each cushion layer.

25. The display device of claim 18, wherein the each cushion layer comprises a first surface on which the each sensing unit is provided and a second surface facing the first surface, and
   a first surface of the display panel and the first surface of the each cushion layer face each other.

26. The display device of claim 25, further comprising a polarizer disposed on a second surface of the display panel.

27. The display device of claim 26, further comprising a window disposed on the polarizer.

28. The display device of claim 25, further comprising a polarizer disposed on the second surface of the each cushion layer.

29. The display device of claim 28, further comprising a window disposed on the polarizer.

30. The display device of claim 17, wherein the first and second electrodes comprise a same material.

31. The display device of claim 30, wherein the first and second electrodes comprise a light absorption material.

32. The display device of claim 30, wherein the first electrode comprises a first branch portion, the second electrode comprises a second branch portion, and the first branch portion and the second branch portion are alternately arranged.

33. The touch sensor of claim 17, wherein the distance between adjacent cushion layers is reduced in the direction toward the edge regions of the base substrate from the central region of the base substrate.

34. A display device, comprising:
a display panel having a front surface on which an image is displayed; and
a touch sensor provided under the display panel and detecting a touch position and a touch pressure,
wherein the touch sensor comprises:
   a base substrate having a central region and edge regions;
   a plurality of sensing units, each sensing unit including a first electrode and a second electrode provided on a same layer and not overlapping with each other, wherein a capacitance of the each sensing unit is changed by a user's touch; and
   a plurality of cushion layers disposed on the plurality of sensing units, wherein a permittivity of the cushion layer is configured to change in response to a pressure of the user's touch,
wherein the each cushion layer comprises a first surface on which the each sensing unit is provided and a second surface opposite to the first surface, and the first surface of the each cushion layer and a lower portion of the display panel face each other;
the each cushion layer comprises an insulator and conductive particles, and
the insulator comprises an elastic material elastically deformed by the pressure of the user's touch,
wherein the distance between adjacent cushion layers varies in a direction toward the edge regions of the base substrate from the central region of the base substrate.

35. The touch sensor of claim 34, wherein the distance between adjacent cushion layers is reduced in the direction toward the edge regions of the base substrate from the central region of the base substrate.

* * * * *